(No Model.)

J. SHATTO.
NECK YOKE.

No. 395,007. Patented Dec. 25, 1888.

Witnesses
Chas. J. Williamson
Charles F. Mills

Inventor
John Shatto,
per Chas. H. Fowler
Attorney.

UNITED STATES PATENT OFFICE.

JOHN SHATTO, OF HEBRON, IOWA.

NECK-YOKE.

SPECIFICATION forming part of Letters Patent No. 395,007, dated December 25, 1888.

Application filed September 17, 1888. Serial No. 285,566. (No model.)

*To all whom it may concern:*

Be it known that I, JOHN SHATTO, a citizen of the United States, residing at Hebron, in the county of Adair and State of Iowa, have invented certain new and useful Improvements in Neck-Yokes; and I do hereby declare that the following is a full, clear, and exact description of the same, reference being had to the annexed drawings, making a part of this specification, and to the letters and figures of reference marked thereon.

Figure 1:
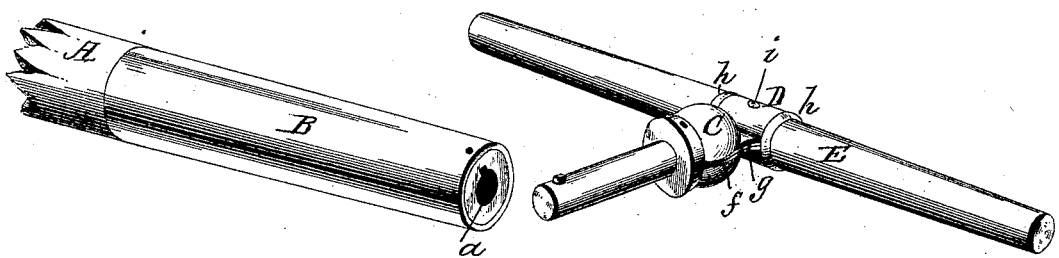
Figure 2:
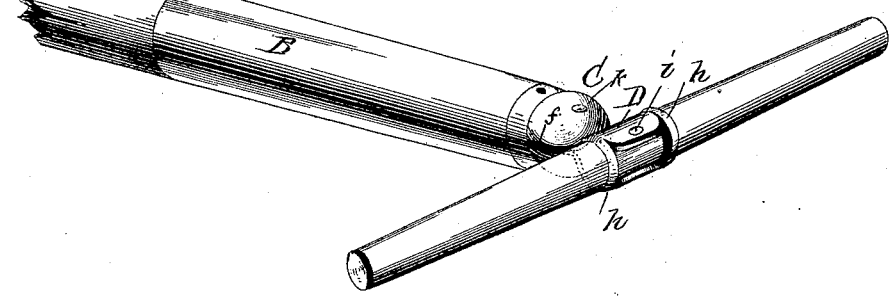
Figure 3:
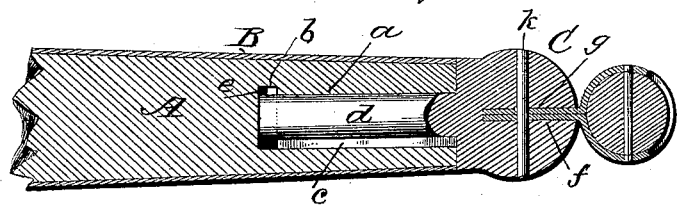

Figure 1 of the drawings is a perspective view showing the neck-yoke and tongue disconnected from each other; Fig. 2, a similar view showing them connected together; Fig. 3, a longitudinal section of Fig. 2 on an enlarged scale.

The present invention has relation to that class of neck-yokes which are attached to the tongue of a vehicle by a swivel connection, and has for its object to improve the manner of attaching the neck-yoke to the tongue, which object I attain substantially as shown in the drawings, and hereinafter described and claimed.

In the accompanying drawings, A represents the tongue of a vehicle, preferably of wood, with a ferrule, B, secured around its end, which is of metal and fastened thereto in any well-known manner. The end of the tongue has a socket, $a$, and at the base of the socket is an annular groove, $b$, and a longitudinal groove, $c$, extending from the annular groove to the extremity of the socket to form a means for locking a pin, $d$, to the tongue, said pin having near its end a key, $e$, which engages with the annular groove $b$, and when the pin is turned to bring the key out of line with the groove $c$ the pin will be prevented from being withdrawn. In inserting the pin in the socket the former is turned so that the key thereon will be brought in line with the longitudinal groove, after which the pin is shoved in the full length until the key engages with the annular groove, when by slightly turning the pin to bring the key out of line with the longitudinal groove it will be locked to the tongue. In removing the pin all that is necessary is to turn it until the key thereon is in line with the longitudinal groove, when it may readily be removed. The pin $d$ is formed with a head, C, which has an open kerf, $f$, in which is inserted the flat shank $g$ of a clip, D, and to this clip is suitably connected the neck-yoke E between two annular flanges, $h$, on said yoke, the flanges taking the lateral strain off the clip and preventing it working loose from its fastening, which preferably consists of a pin, $i$, or rivet passing through the clip and neck-yoke. A pivot-pin, $k$, passes through the head C and through the shank $g$ to form a pivotal connection between the head and shank, while the pin $d$ admits the head turning upon its axis, thus forming a swivel connection between the vehicle-tongue and neck-yoke.

Having now fully described my invention, what I claim as new, and desire to secure by Letters Patent, is—

A vehicle-tongue having a socketed end with annular and longitudinal grooves, in combination with a pin having a key thereon and formed with a head having a kerf therein, a clip having a shank inserted in the kerf and pivotally connected thereto, and a neck-yoke pivotally connected to the clip, substantially as and for the purpose described.

In testimony that I claim the above I have hereunto subscribed my name in the presence of two witnesses.

JOHN SHATTO.

Witnesses:
JACOB MAGEE,
ED PORTER.